US009530074B2

(12) United States Patent
Newton et al.

(10) Patent No.: US 9,530,074 B2
(45) Date of Patent: Dec. 27, 2016

(54) FLAME DETECTION SYSTEM AND METHOD

(71) Applicant: Michael Newton, Northwich (GB)

(72) Inventors: Michael Newton, Northwich (GB); Paul R. Colbran, Cheshire (GB)

(*) Notice: Subject to any disclaimer, the term of this patent is extended or adjusted under 35 U.S.C. 154(b) by 0 days.

(21) Appl. No.: 14/568,951

(22) Filed: Dec. 12, 2014

(65) Prior Publication Data

US 2015/0169984 A1 Jun. 18, 2015

Related U.S. Application Data

(60) Provisional application No. 61/915,756, filed on Dec. 13, 2013.

(51) Int. Cl.

| | |
|---|---|
| ***G06K 9/46*** | (2006.01) |
| ***G06K 9/48*** | (2006.01) |
| ***G06K 9/52*** | (2006.01) |
| ***G08B 17/12*** | (2006.01) |
| *G08B 29/28* | (2006.01) |

(52) U.S. Cl.
CPC . *G06K 9/48* (2013.01); *G06K 9/52* (2013.01); *G08B 17/125* (2013.01); *G08B 29/28* (2013.01)

(58) Field of Classification Search
None
See application file for complete search history.

(56) References Cited

U.S. PATENT DOCUMENTS

| | | | | |
|---|---|---|---|---|
| 5,510,772 | A * | 4/1996 | Lasenby | G08B 17/125 250/554 |
| 2003/0038877 | A1* | 2/2003 | Pfefferseder | G06K 9/6293 348/82 |
| 2005/0069207 | A1 | 3/2005 | Zakrzewski et al. | |
| 2006/0215904 | A1* | 9/2006 | Ibrahim | G06K 9/00771 382/159 |
| 2012/0195462 | A1* | 8/2012 | Pu | G06T 7/408 382/103 |

FOREIGN PATENT DOCUMENTS

| | | | |
|---|---|---|---|
| CN | 101577033 | A | 11/2009 |
| EP | 0822526 | A2 | 2/1998 |
| JP | H10143777 | A | 5/1998 |

OTHER PUBLICATIONS

Wang et al. "A Hybrid Fire Detection Using Hidden Markov Model and Luminance Map." International Conference on Medical Image Analysis and Clinical Applications, Jun. 10, 2010, pp. 118-122.*

(Continued)

*Primary Examiner* — Jon Chang
(74) *Attorney, Agent, or Firm* — Cozen O'Connor

(57) ABSTRACT

A hazard detection system measures a color and intensity of a portion of an image of a scene. The image is obtained using a known gain and/or exposure such that the image substantially lacks any saturation. A black body brightness temperature and the corresponding block body intensity are determined based on the measured color. A hazard condition, such the presence of a flame, can be detected using a comparison of the measured intensity and the computed intensity. The gain and/or exposure can be selected such that only the pixels of intensity greater than a certain threshold generally saturate in the captured image. Hazard conditions, such as smoke, can be detected using images in which selective saturation is permitted.

15 Claims, 5 Drawing Sheets

FRAME C

(56) References Cited

OTHER PUBLICATIONS

Yan et al. "Identification Method of Forest Fire Based on Color Space." 2nd International Conference on Industrial Mechatronics and Automation, May 30, 2010, pp. 448-451.*

International Search Report and Written Opinion for International Patent Application No. PCT/IB2014/003112 mailed Jun. 17, 2015, (12 pages).

Sentenac, T., et al. (Dec. 2014) "Overheating, flame, smoke, and frieght movement detection algorithms based on charge-coupled device camera for aircraft cargo hold surveillance", *Optical Engineering*, vol. 43, No. 12 (19 pages).

* cited by examiner

FLAME DETECTION SYSTEM AND METHOD

CROSS-REFERENCE TO RELATED APPLICATIONS

This application claims benefit of priority to U.S. Provisional Patent Application No. 61/915,756, entitled "Flame Detection System and Method," filed on Dec. 13, 2013, the entire contents of which are incorporated herein by reference in their entirety.

FIELD OF THE INVENTION

This invention generally relates to hazard (e.g., fire, smoke, etc.) detection systems and in particular to image processing systems for hazard detection.

BACKGROUND

Hazard detection systems such as smoke-detection systems and carbon-monoxide detection systems are commonly used in homes and commercial buildings as these systems can provide an early warning of a hazardous condition, typically a fire, and can avoid serious bodily injury and/or may save lives. Such warning can be provided even sooner by directly detecting fire, e.g., by detecting a flame. Some heat-sensing based flame-detection techniques can be significantly costly and, hence, wide-scale use thereof is not highly likely.

Some cost-effective techniques that employ image processing for flame detection perform flicker detection. In general, a flicker detection system captures a series of images of a scene enabling detection of motion in the captured scene. The system then filters out motion at a certain range of frequencies, i.e., image data changing at a rate within a specified range, e.g., between 1.25 Hz and 4 Hz. Motion within this range is considered to be related to the flicker of a flame. Therefore, further analysis of the filtered and extracted data can lead to flame detection. Flicker detection systems can be highly inaccurate as they tend to exhibit a large false positive error, i.e., they often falsely determine the presence of a flame when none is present in the scene.

Reasons for false detection include presence of moving objects that are not flames, and changes in illumination. Typical examples include CRT displays and rotating lights of emergency vehicles, within the field of view. Detection systems may have poor sensitivity to flames when light levels are so low that the intensity of the light from the flame can result in a glowing white pulsating blob rather than a clearly defined flame. This can occur if the camera has adjusted its sensitivity to accommodate for the overall the low light conditions, resulting in any flame in a small area of the scene rapidly saturating within the image. Thus, for reliable flame detection, improved methods and systems that are both accurate and cost effective, are needed.

SUMMARY

Various embodiments of the present invention feature a flame-detection system that uses image processing for cost effectiveness while facilitating accurate flame detection by minimizing both false positive and false negative error rates. This is achieved at least in part by taking advantage of a physical property of typical flames, that their emissivity is similar to that of a black body. Specifically, color and intensity of an area of a captured image is measured. If the color is determined to correspond to a black-body color, a black-body intensity corresponding to the measured color is determined. The presence of a flame is then detected based on, at least in part, a comparison of the black-body intensity and the measured intensity.

An accurate measurement of the color and intensity generally requires capturing images that substantially lack any saturation. In addition, measurement of the color and/or intensity may require knowledge of the exposure and/or gain of the imaging device used to capture the images. Therefore, the gain and/or exposure of the imaging device may be selected, thereby those values are known, so as to substantially eliminate any saturation in the captured images. Additionally, conventional images of the scene may be captured as well, to facilitate further processing such as determination of flame location. A single camera may be adapted to capture both conventional images and those substantially lacking any saturation and for which the gain and/or exposure are known.

Accordingly, in one aspect, a method of detecting a hazard includes obtaining a first image of a scene, where the first image substantially lacks any saturation. The method also includes measuring color and intensity of at least a portion of the first image. In this measurement a value or values of one or more imaging parameter associated with the first image are used. Examples of the imaging parameters include gain, exposure, aperture of an imaging device, etc. The method also includes computing a reference intensity related to the measured color, and comparing the measured intensity with the reference intensity to determine, at least in part, if the portion of the first image indicates a hazard condition.

In some embodiments, obtaining a first image of a scene includes receiving the first image from an imaging device, such as a camera. Obtaining the first image may include adjusting one or more parameters of an image sensing device (e.g., a charge-coupled device (CCD) camera), to remove substantially any saturation in an image captured by the device. An image of the scene may be captured using the device (e.g., a camera), to obtain the first image. The parameters that can be adjusted may include one or more of gain, exposure, and aperture of an imaging device. In some embodiments, an imaging parameter associated with the first image includes a substantially constant gain. Substantially constant generally means a tolerance of less than 0.1%, 0.5%, 1%, 10%, etc., relative to a nominal gain.

In some embodiments, computing the reference intensity includes determining a black body brightness temperature corresponding to the measured color, and computing the reference intensity based at least in part on the black body brightness temperature. Comparing the computed reference intensity and the measured intensity may include computing an emissivity factor as a ratio of the measured intensity to the reference intensity, and determining if the emissivity factor lies within a specified range corresponding to the hazard condition. The hazard condition may include presence of a flame and/or smoke in the scene.

In some embodiments, the method includes obtaining a second image of the scene, where the second image, like the first image, substantially lacks any saturation. The measuring, computing, and comparing steps are repeated for at least a portion of the second image that corresponds to the processed portion or entirety of the first image. A hazard condition may be determined to be present in the scene only if it is determined that at least one of the first and second images indicates the hazard condition. In some embodiments, several images are analyzed as described above, and a hazard condition may be determined to be present in the scene only if it is determined that at least some (e.g., a majority, more than a specified number, etc.) of the several images indicate the hazard condition. The several images may represent several frames, e.g., successive frames, of the still and/or moving images of the scene.

The method may include determining if the measured color corresponds to a black body color, to determine at least in part if the portion of the first image indicates a hazard condition. In other words, if the measured color is not a black body color, a hazard condition may not be present. In some embodiments, the method includes obtaining a second image of the scene, and correlating the first image and the second image to determine a location of the hazard.

In another aspect, a hazard detection system includes an imaging device. One or more parameters of the device, such as gain, exposure, aperture, etc., can be selected so as to remove substantially any saturation in a first image of a scene captured by the imaging device. In various embodiments, substantially removing saturation can mean limiting the saturation to 99%, 98%, 95%, 90%, 80%, etc., of a peak saturation value. In some embodiments, substantially removing saturation can mean limiting a fraction of the image that can be saturated to no more than 0.5%, 1%, 2%, 5%, 10%, 20%, etc., of the total image. The system also includes a processor adapted or programmed to measure color and intensity of at least a portion of the captured first image, and to compute a reference intensity related to the measured color. In addition, the processor is adapted or programmed to compare the measured intensity with the reference intensity to determine, at least in part, if the portion of the captured first image indicates a hazard condition. The imaging device may include a CMOS image sensor adapted to capture images at a rate of at least 30 frames per second. In some embodiments, the gain of the imaging device is adjusted to a substantially constant value. Substantially constant generally means a tolerance of less than 0.1%, 0.5%, 1%, 10%, etc., relative to a nominal gain value.

The imaging device may be adapted to capture a second image of the scene, and/or a series of images of the scene. One or more parameters of the imaging device may be selected to allow saturation in the second image or, alternatively, one or more parameters may be selected to avoid substantially saturation in the second image and/or the series of images. The processor may be further adapted or programmed to correlate spatially the first and second images, to determine a location of any detected hazard.

BRIEF DESCRIPTION OF DRAWINGS

Various features and advantages of the present invention, as well as the invention itself, can be more fully understood from the following description of various embodiments, when read together with the accompanying drawings, in which.

DETAILED DESCRIPTION

Figure 1:
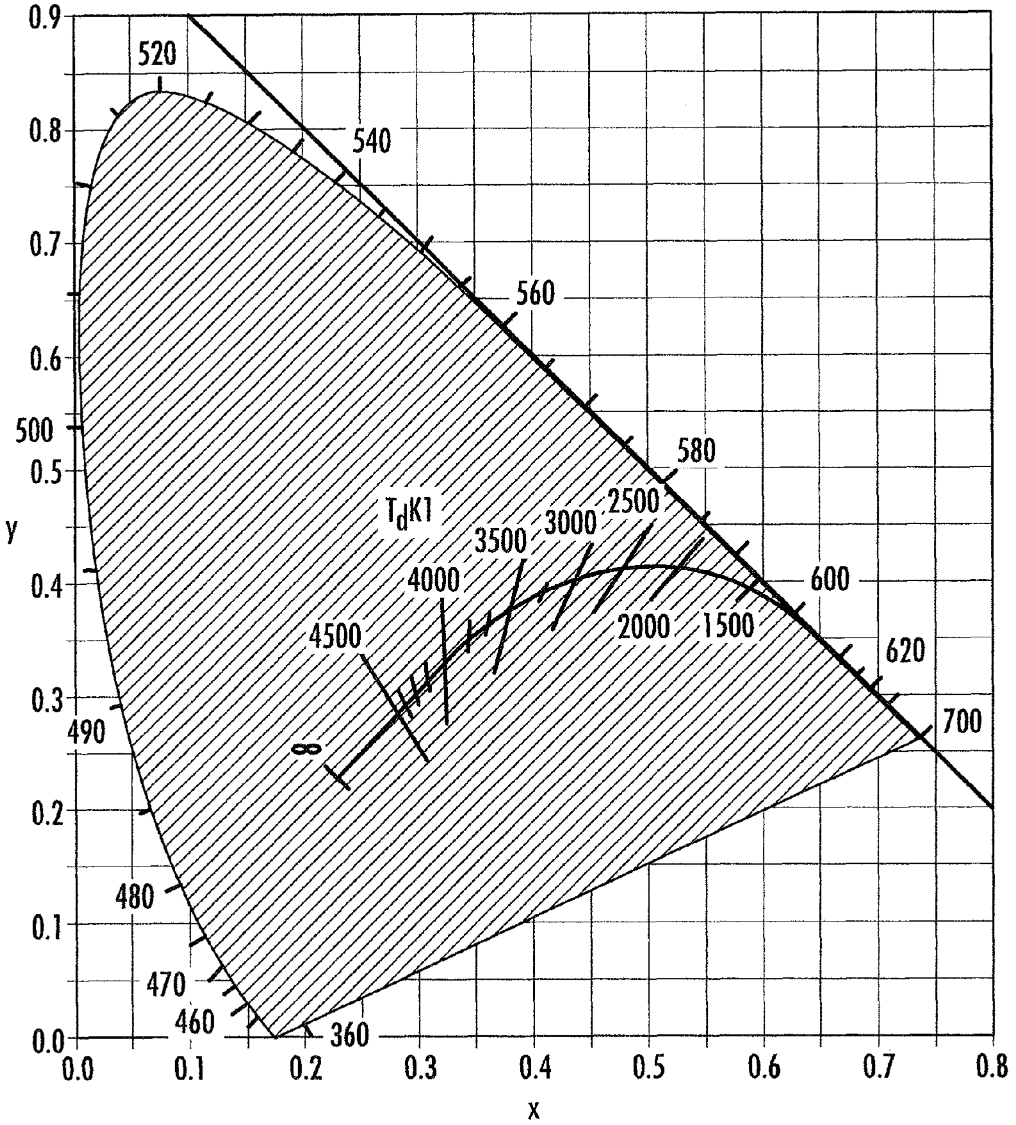
FIG. 1 depicts the Planckian locus of a black body.

The visible element of a typical hydrocarbon flame results from the black body emissions of the heated soot generated from combustion process. The absolute brightness and color of a black body can be derived from Plank's Radiation law and to a degree Rayleigh-Jeans law. Specifically, when a black body is heated, its color changes from red to yellow, to white, and to blue. The locus depicted in FIG. 1 illustrates a relationship between the temperature of a black body and color thereof. The intensity or brightness of a black body is also a function of temperature thereof. With reference to FIG. 1, lines crossing the locus indicate lines of constant correlated color temperature of a black body.

In particular, the relationship of intensity and temperature for a black body emission is given by Planck's law as:

$$I_v = \frac{2hv^3}{c^2}\frac{1}{e^{\frac{hv}{kT}}-1}$$

where $I_v$, i.e., the intensity or brightness is the amount of energy emitted per unit surface per unit time per unit solid angle and in a frequency range [v,v+dv]; T is the temperature of the black body; h is Planck's constant; v is frequency of emission, which corresponds to the color of emission; c is the speed of light; and k is Boltzmann's constant.

The Planckian locus obtained from Planck's Radiation Law can be applied to light emitted by the hot soot which can be described as a grey body. For a grey body, i.e., any object emitting radiation, such as a flame, the spectral radiance is a portion of the black body radiance as determined by the emissivity $\epsilon$ of the grey body, and is given by the expression for the reciprocal of the brightness temperature:

$$T_b^{-1} = \frac{k}{hv}\ln\left[1 + \frac{e^{\frac{hv}{kT}}-1}{\epsilon}\right]$$

Rayleigh-Jeans law describes that $$I_v = \frac{2v^2kT}{c^2}$$

At certain low frequencies and high temperatures, where hv>>kT, Rayleigh-Jeans law can be applied so that the brightness temperature of a grey body can be simply written as:

$$T_b = \epsilon T$$

As depicted in FIG. 1, there is a specific wavelength and, hence, frequency for a specified temperature of a black body, and the intensity will be a constant for each point along the Planckian locus, as a function of the wavelength. Thus, for a black body emitting energy at a specified wavelength/frequency there is an intensity corresponding to that frequency (i.e., wavelength or color) as determined by a point on the Planckian locus. This black body intensity can be compared to the actual intensity of a grey object emitting energy at the specified wavelength, to determine if the emissivity of the grey object is within an acceptable range. In practice, the emissivity is less than one, and does not exceed one.

Typically for small flames, there is a band of emissivity from a minimum threshold (e.g., 0.6, 0.75, 0.8, 0.9, etc.) to a maximum of one; emissivity of one implies an approximate black body flame signature. A typical oil fire of about one meter in size has an emissivity of about one. Any measurement of color and intensity implying an emissivity greater than one does not correspond to a flame. If the area in which the flame is present begins to fill with smoke the transmittance of the smoke may decrease the measured intensity, and thus, the emissivity would be less than one, but likely greater than the selected minimum threshold.

Generally, the flickering effect within a flame results from the varying temperatures within the flame. Therefore, a single correlation of the measured intensity and the computed black-body intensity corresponding to the measured color can be only a partial indicator of the presence of a flame. A number of occurrences of similar emissivity within the required minimum threshold and one, within a short time window, can be reliable indicator of the presence of a flame.

It should be noted that the intensity of a flame generally does not vary significantly with the size of the flame, other than when the emissivity approaches one as described above. The total radiated energy, however, can change according to flame size. The reflected illumination can also change. For example, as the flame size increases the reflected illumination can increase because the total amount of energy and area of illumination may increase, and that energy may be reflected from various surfaces. It is often perceived that a bigger fire has a greater intensity, but it is the amount of light that may increase, and not typically the intensity of a given point. The above-described technique is based on, at least in part, the measured intensity and the expected emissivity as specified by the minimum threshold. Therefore, the detection of a flame using this technique can be accurate regardless of the flame size.

In a similar manner to comparing the measured intensity with the intensity computed using Planckian locus for a black body, the measured intensities and colors of various types of gas flames (e.g., the "blue" flame in a "clean" Bunsen burner flame, a flame or fire that can result from an industrial chemical process, etc.), can be used to obtain loci of intensity and color, each corresponding to a specific flame. Any such locus can then be used as a reference to determine if a flame of the type corresponding to the locus is present in the scene by comparing the measured intensity with the intensity provided by the locus.

With a normal video imager, the range of light levels to be accommodated have a very wide dynamic range. Low light conditions may be only a few lux of luminosity, whereas full daylight has about 25,000 lux luminosity, and direct sunlight can be up to 130,000 lux in luminosity. A typical digital video signal typically only represents between 8 and 10 bits of resolution for a pixel, the bits representing the red, green, and blue values of the pixel. As such, a combination of exposure, automatic gain control (AGC), and other wide dynamic range techniques are often applied to allow for capturing images of different and mixed scenes having different luminosities. A typical light level within a tunnel, e.g., can be about 20-50 lux, and about 500 lux in an office building or a factory. Under these low light conditions an image of a flame typically saturates. Due to the fact that the camera normally adjusts its sensitivity to suit the scene illumination, it is not possible to measure absolute color and intensity from a conventional image.

To facilitate an accurate measurement of color and intensity, in one embodiment a CMOS image sensor capable of capturing 60 frames per second is used. In capturing one set of frames, the sensor is set to a fixed, predetermined exposure and gain levels such that the absolute light intensity viewed by the sensor can be measured using the known exposure and gain levels. The exposure and gain level is selected to substantially avoid any saturation in any portion of a captured frame. Different frames can all use the same exposure and gain values, or different frames may use different combinations of exposure and gain values. In some embodiments, the gain may be adjusted simultaneously in an absolute ratio between the red (R), green (G), and blue (B) levels, such that the color representation of the scene, which would otherwise be compensated for by the normal white balance operation of the sensor, remains substantially constant. Using the exposure and gain value of each frame, the absolute intensity and colors of the viewed scene as captured by that frame are measured.

Another set of frames can be captured using a normal exposure, i.e., with the gain and exposure frequently adjusting to suit the target scene using typical electronic iris, AGC, and/or auto white balance control algorithms. In these frames, some portions of some frames may be saturated. This set of frames is suitable for use as a conventional CCTV source.

This provides two independently captured but correlated images of the same scene. One providing an absolute representation of light intensity, called Absolute Intensity Image (AII), and the other representing a conventional Visible Range Image (VRI). In one embodiment, a 60 frames per second (fps) image sensing device is adjusted in each frame such that the sequence of captured frames includes an alternating sequence of VRI and AII frames, each at 30 fps.

The AII may be calibrated such that the anticipated range of light intensities can be observed across the desired range of the Planckian locus. In general, unsaturated AII images must be captured for black body temperatures across a wide range (e.g., 800-2000 C). This may require testing a few different, known gain/exposure combinations, so as to cover a large intensity range with sufficient accuracy. Pixels which are saturated in an image captured using a certain exposure may disregarded as the same pixels in an image captured using a relatively shorter exposure may not be saturated. Calibration for a specified range of brightness temperature can be achieved by measuring the AII image using a black body source of known temperatures as a source of illumination. As the black body temperature is known, the color and intensity thereof can be determined as described above. Using these determined colors and intensities, the relative RGB components and intensities of various captured images can be calibrated. This generally removes errors due to losses in the lens optics which may be different in the R, G, and B bands.

Figure 2:
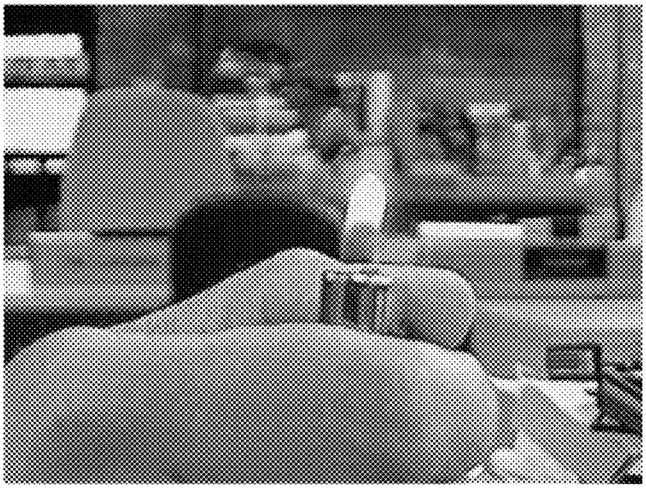
FIG. 2 shows a conventional image of a scene.
Figure 3:
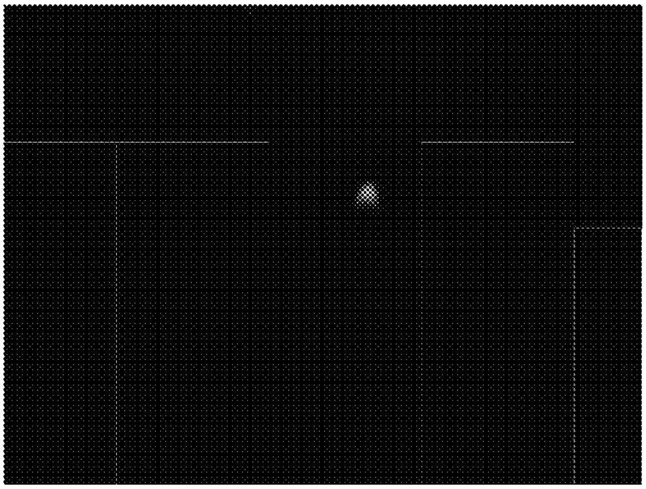
FIG. 3 shows a corresponding image based on known gain and exposure, according to one embodiment.

With reference to FIG. 2, an exemplary VRI image frame includes a window, two chairs, and a flame. Light through the window appears about as bright as a portion of the flame. As shown in FIG. 3, in a corresponding AII frame, captured using a fixed, known exposure and gain, even a small flame in an internal lit area is clearly visible, while the rest of the scene remains dark. The dark portion even includes the portion of the scene corresponding to the external light through the window to the left.

Using a frequency filter, and a qualification of hue, saturation, and values (HSV—a cylindrical-coordinate representation of points in an RGB color model), a high probability of detecting flame accurately can be achieved. The colors of the flame can be easily distinguished and, hence, the relationship between intensity and color can be used to derive an emissivity factor. By determining whether the emissivity factor lies within a selected lower-bound threshold and a selected upper threshold (usually one), the presence of flame can be detected.

A false detection of a flame can occur if the detection is based on a single frame, i.e., a single correlation between the measured intensity and the computed, color-based intensity. The false detection rate can be reduced taking advantage of the changing nature of a hydrocarbon flame through guttering. To this end, some embodiments ensure that a sequence of correlations occurs within a selected time window, rather than relying on any flicker frequency characteristics, for which there are many common non-flame stimuli that can be mistaken for false positives.

One embodiment allows for multiple AII images at individual calibrated ranges of intensity/brightness temperature, and these can be mapped into a single image map at greater bit depth than can be achieved with a single capture. As there is no requirement for frequency analysis, this can be performed as a sequence over a number of consecutive frames. This allows a wider range of intensities and therefore temperatures to be measured.

In some embodiments, instead of starting from a fixed single gain, the RGB gains and exposures are adjusted until there is no saturation within the image. Having determined a level of gain and exposure that substantially prevents any saturation in an AII image, the absolute intensity can be calculated for each pixel in the image.

In some embodiments, the VRI frames are used for the detection of reflected flame signatures and/or smoke. At least in part due the reflectivity of various surfaces reflecting a flame at the flame wavelengths, the reflected flame signatures typically have substantially lower intensities than the actual flame. Therefore, the computed emissivity factor associated with the image of a reflected flame may be less than the specified minimum threshold, allowing for distinguishing the reflected flame from an actual frame and, thus, avoiding a false positive detection of a flame.

In conventional smoke detection systems, one source of false positives is external lighting that can reduce the contrast within a captured scene. The effect of external light can be significant if a part of the image reaches a saturation level. It can be difficult to reliably differentiate a saturated portion of the image from a white smoke surface at moderate illumination. In one embodiment, such false positives can be minimized by excluding pixels that are above an upper saturation threshold, i.e., close to saturation because, typically, smoke does not produce a saturated image. An AII frame can be used in conjunction with the VRI frame to determine with greater certainty that the loss of detail and, hence, contrast is not due to obscuration by smoke, but as a result of intense light creating near saturation of part of the image scene.

A bright light source typically massively saturates a VRI image and a white smoke cloud typically only marginally saturates the VRI image. Ordinarily, smoke is not significantly brighter than the brightest points in the smoke free scene, but once pixels are saturated in the VRI image it is usually difficult to distinguish between the respective intensities of bright light and smoke. An AII image of the scene, obtained by selecting a gain and/or exposure that may permit saturation due to external light but substantially prevents saturation due to white smoke, can be used to identify massively saturated pixels in the VRI image. Pixels corresponding to smoke may be saturated in the VRI image but are likely not saturated in the corresponding AII image, which allows for the detection of smoke.

In one embodiment, a smoke detector applies spatial and temporal pre-filtering to the captured frames. The pre-filtering is adjusted to reject moving objects with well-defined edges. In addition, some embodiments analyze net contrast changes, typically only passing elements i.e., objects in a captured frame, with a decreasing contrast level. Changes in illumination are typically rejected by analyzing and passing only changes in contrast, rather than level. This can address even the most difficult recurrent problems of shadows being cast by changes natural lighting, resulting from clouds passing overhead, etc.

Figure 4A:
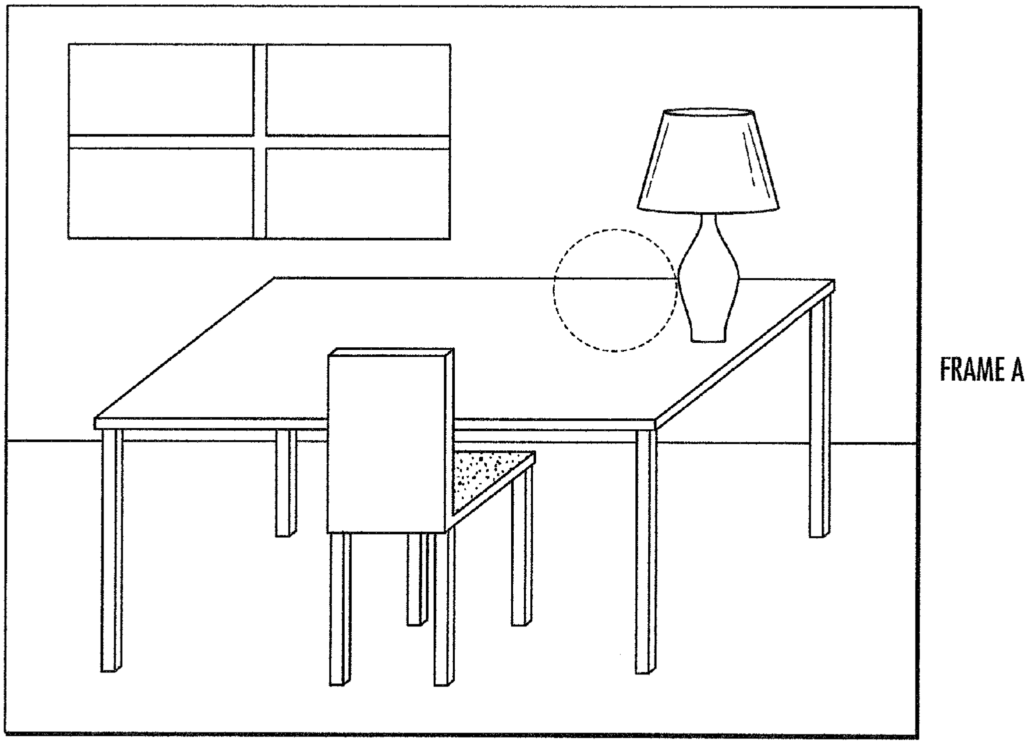
FIGS. 4A-4C schematically illustrate smoke detection, according to one embodiment.
Figure 4B:
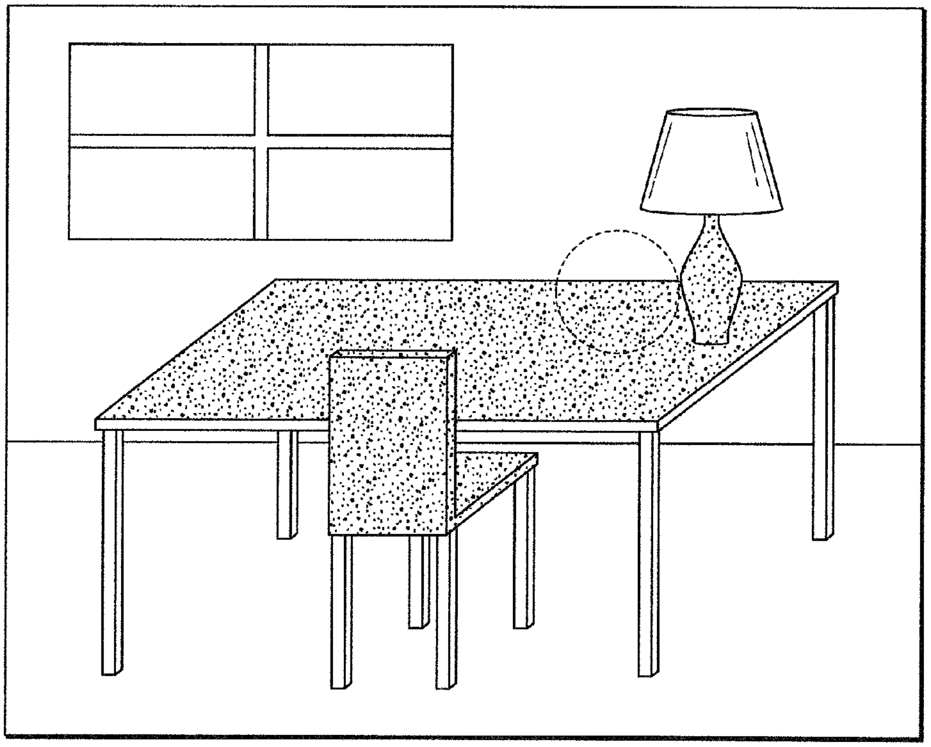
Figure 4C:
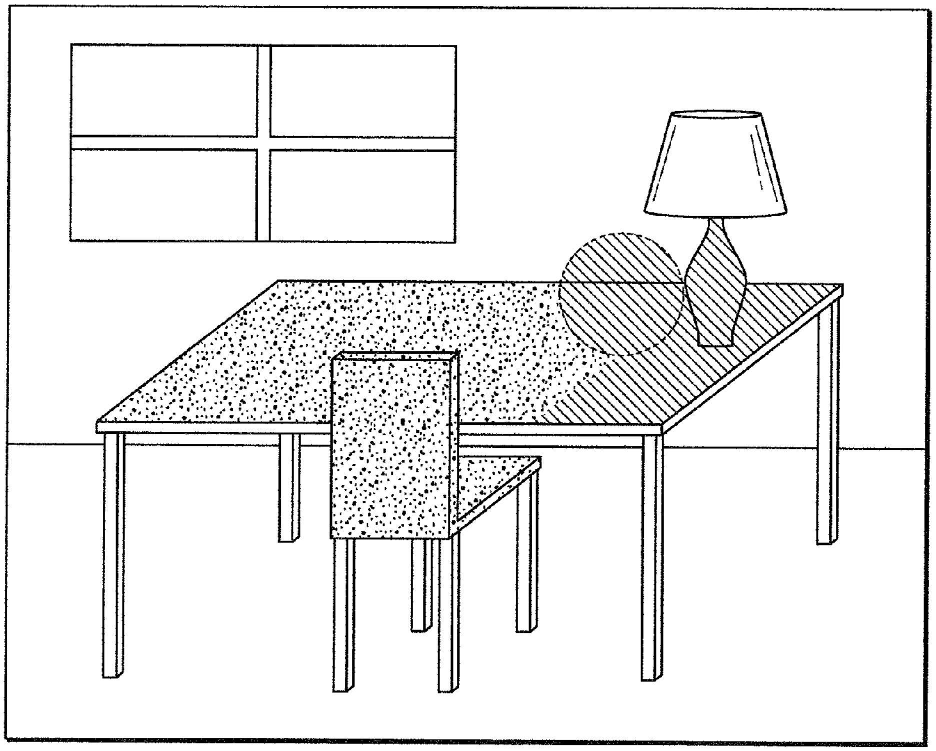

With reference to FIGS. 4A-4C, an exemplary frame, denoted Frame A, includes a window, a table, a chair, and a lamp. Due to passing of a cloud, the intensity level associated with all of these objects decreases in a subsequently captured frame, denoted Frame B. The respective differences in the intensities of the corresponding objects in Frame A and Frame B are substantially similar and, hence, the detector does not determine that smoke is present. In another frame, denoted Frame C and captured after capturing Frame B, the intensities of the chair and table do not change significantly relative to the corresponding intensities measured using Frame B. The intensity of a region near the lamp decreases, however, and the detector determines presence of smoke near the lamp.

This smoke detector is typically false alarm free, with only a small number of special cases resulting in false alarms. The false alarm rate of these special cases, generally associated with saturation in the VRI images, may be decreased or even reduced to zero by comparing pixels in a VRI image with a corresponding pixels in the AII image. The embodiments of the smoke detector described herein generally require low manual configuration and intervention.

Having described herein illustrative embodiments, persons of ordinary skill in the art will appreciate various other features and advantages of the invention apart from those specifically described above. Various combinations and permutations of the recited features, materials, and properties described herein are within the scope of the invention. It should therefore be understood that the foregoing is only illustrative of the principles of the invention, and that various modifications and additions can be made by those skilled in the art without departing from the spirit and scope of the invention. Accordingly, the appended claims shall not be limited by the particular features that have been shown and described, but shall be construed also to cover any obvious modifications and equivalents thereof.

What is claimed is:

1. A method of detecting a hazard, the method comprising:

obtaining a first image of a scene;

measuring color and intensity of at least a portion of the first image, using a value of at least one imaging parameter associated with the first image;

computing a reference intensity related to the measured color; and comparing the measured intensity with the reference intensity to determine at least in part if the portion of the first image indicates a hazard condition by computing an emissivity factor as a ratio of the measured intensity to the reference intensity; and determining if the emissivity factor lies within a specified range corresponding to the hazard condition.

2. The method of claim 1, wherein the obtaining step comprises receiving the first image from an imaging device.

3. The method of claim 1, wherein the obtaining step comprises: adjusting the at least one imaging parameter of an image sensing device to remove saturation in an image captured by the device; and capturing an image of the scene via the device to obtain the first image.

4. The method of claim 3, wherein the at least one imaging parameter comprises at least one of a gain, an exposure, and an aperture of an imaging device.

5. The method of claim 3, wherein the at least one imaging parameter comprises a substantially constant gain.

6. The method of claim 1, wherein the at least one imaging parameter comprises at least one of a gain, an exposure, and an aperture of an imaging device.

7. The method of claim 1, wherein the computing step comprises: determining a black body brightness temperature corresponding to the measured color; and computing the reference intensity based at least in part on the black body brightness temperature.

8. The method of claim 1, wherein the hazard condition comprises a flame.

9. The method of claim 1, further comprising: obtaining a second image of the scene; and repeating the measuring, computing, and comparing steps for at least a portion of the second image that corresponds to the at least a portion of the first image.

10. The method of claim 1, further comprising determining if the measured color corresponds to a black body color to determine at least in part if the portion of the first image indicates a hazard condition.

11. The method of claim 1, further comprising: obtaining a second image of the scene; and correlating the first image and the second image to determine a location of the hazard.

12. A hazard detection system comprising:

an imaging device comprising a parameter selectable to remove saturation in a first image of a scene captured by the imaging device; and a processor adapted to:

measure color and intensity of at least a portion of the captured first image;

compute a reference intensity related to the measured color; and compare the measured intensity with the reference intensity to determine at least in part if the portion of the captured first image indicates a hazard condition, wherein the imaging device is further adapted to capture a second image of the scene, the parameter being selected to allow saturation in the second image; and the processor is further adapted to spatially correlate the first and second images, to determine a location of any detected hazard.

13. The system of claim 12, wherein the imaging device comprises a CMOS image sensor adapted to capture images at a rate of at least 30 frames per second.

14. The system of claim 12, wherein the parameter comprises at least one of gain, exposure, and aperture.

15. The system of claim 12, wherein the parameter comprises a substantially constant gain.

* * * * *